April 17, 1928.
I. GUIDUCCI
LOCK NUT
Filed Jan. 26, 1927
1,666,375
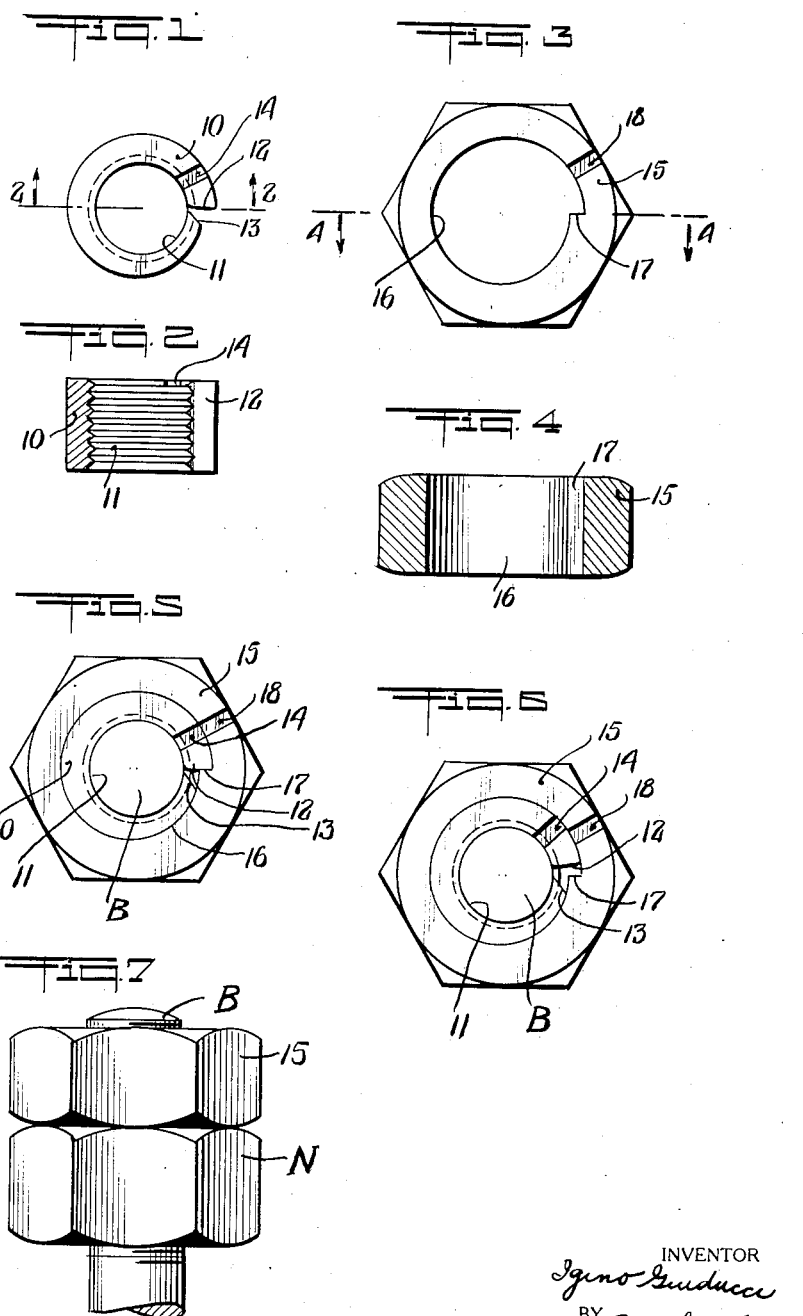
INVENTOR
Igino Guiducci
BY Mock & Blum
ATTORNEYS Patented Apr. 17, 1928.

1,666,375

UNITED STATES PATENT OFFICE.

IGINO GUIDUCCI, OF TIVOLI, ROME, ITALY.

LOCK NUT.

Application filed January 26, 1927. Serial No. 163,696.

My invention relates to a new and improved form of lock nut.

One of the objects of my invention is to provide a simple, durable and efficient lock nut which can be readily forced into locking position and which can be readily forced out of the locking position while it is held firmly in place against minor shocks, vibrations and the like.

Another object of my invention is to provide a form of lock nut which can be readily applied to or removed from a bolt or the like.

Other objects of my invention will be set forth in the following description and drawing which illustrate a preferred embodiment of my invention, it being understood that the above general statement of the objects of my invention is intended merely to generally explain the same and not to limit it in any manner.

Fig. 1 is a top view of the resilient locking member used in connection with a nut.

Fig. 2 is a section on the line 2—2 of Fig. 1.

Fig. 3 is a top view of the nut with which the device shown in Fig. 1 is associated.

Fig. 4 is a section on the line 4—4 of Fig. 3.

Fig. 5 is a top view showing the assembly of the parts, while the nut is in the free position.

Fig. 6 shows the assembly of the parts when the nut has been forced to the locking position.

Fig. 7 is an elevation showing how the lock nut is applied to a bolt.

Lock nut constructions have been heretofore proposed but they were either expensive or complicated or could not be readily removed from a bolt when this was necessary. According to my invention, the lock nut is frictionally locked into position on a bolt so that it is firmly held against minor shocks, vibrations and the like. Nevertheless, the lock nut can be removed by applying sufficient force so as to cause it to turn in the reverse direction.

As shown in Figs. 3 and 4, the lock nut 15 has a smooth inner wall 16 which is provided with a shoulder 17. The top of the lock nut is provided with a lateral notch or depression 18.

A resilient split annulus 10 having interior threading 11 is adapted to be forced into the recess of the lock nut 15 so that the parts form the assembly shown in Fig. 5. The inner wall of the annulus 10 has a circular contour so that this annulus can be screwed into position upon a bolt B. The outer wall of the annulus 10 is eccentric as clearly shown in Fig. 1, and the ends of the annulus may be slightly separated as shown in Fig. 1, and they are provided with adjacent faces 12 and 13. The top of the annulus is provided with a notch 14 and the notches 14 and 18 are guide notches to facilitate the proper assembly of the parts. When the parts are properly assembled, the notches 14 and 18 are aligned, as shown in Fig. 5. These notches 14 and 18 may be omitted without departing from my invention.

When the parts are assembled, the broad edge 12 of the annulus 10 abuts the shoulder 17 of the lock nut 15.

When the parts are in the position shown in Fig. 5, the lock nut 15 may be readily applied to or removed from the bolt 7, so that the nut N can be firmly held in position or be readily removed.

When the lock nut 15 is applied with considerable force, the two nuts 15 and N being in the position shown in Fig. 7, the device operates as follows:—

The nut N cannot move downwardly upon the bolt B because it abuts some fixed member or is held in position in any suitable manner. If it is assumed that the bottom of the annulus 10 projects slightly below the bottom of the lock nut 15, then the bottom of the said annulus 10 abuts the top of the nut N after the lock nut 15 has been sufficiently turned, so that the annulus 10 is restrained from further longitudinal movement. At this point, further turning of the lock nut 15 produces an angular relative displacement between the lock nut 15 and the annulus 10, so that the parts are moved to the relative position indicated in Fig. 6. Since the inner wall 16 of the lock nut 15 has an eccentric contour corresponding to the eccentric contour of the outer wall of the annulus 10, this relative angular displacement has the effect of producing a very firm frictional grip between the lock nut 15 and the annulus 10, so that it requires considerable force to turn the lock nut 15 in the reverse direction. Since the inner wall 16, and the outer wall of the resilient split annulus 10 have the contours shown in Figs. 1 and 3, the angular displacement between the members 15 and 10 also firmly forces the threading 11 of the annulus 10 against the threading of the bolt B, so that a frictional grip is also produced between the bolt and the annulus 10. The lock nut 15 is thus firmly held in position by a frictional lock or grip which, however, can be readily released by turning the nut 15 in the reverse direction with sufficient force.

If, when the parts are assembled as shown in Fig. 5, it is assumed that the bottom of the annulus 10 is slightly above the bottom of the lock nut 15, the turning of the lock nut 15 gradually forces the annulus 10 downwardly into the correct position in which the bottom of the annulus 10 abuts the top of the lower nut N. The annulus 10 and the outer member 15 must be turned in the clockwise direction, assuming that the eye of the observer is above the top of the bolt shown in Fig. 7, in order to move the lock nut device into locking position. If this movement be defined as the locking movement of the device, it will be noted that the radius of the outer wall of the annulus 10 increases in the direction of said locking movement so that the said radius is longest at the right-hand side of the device shown in Fig. 1.

By reason of this construction no special manipulation is necessary to operate the lock nut device, as it is merely necessary to turn the outer member 15 in the normal direction by means of a wrench or the like. This outer member 15 can be freely turned together with the annulus 10, until the bottom of the annulus 10 abuts the nut N. A slight additional turn of the outer member 15 in the locking direction is all that is then necessary to force the device into operative position.

It is obvious that the two parts shown herein are extremely simple and durable in construction and that careful assembly of the parts is not required.

I have shown a preferred embodiment of my invention, but it is clear that numerous changes and omissions could be made without departing from its spirit.

The split annulus 10 is made of any suitable metal.

The central longitudinal axis of the bolt B may be considered as defining the central point with respect to which the inner wall 16 of the lock nut 15 is eccentric.

I claim:—

In a lock nut device adapted to be applied to the threaded portion of a bolt over a nut engaging said threaded portion, the combination of an outer member separate from said nut and having an inner eccentric wall, an inner member separate from said nut and said outer member and located within said outer hollow member, said inner member being longitudinally slidable with respect to said outer member, said resilient member having an outer eccentric wall corresponding to the inner eccentric wall of said outer member, the length of the radius of the outer eccentric wall of said resilient member increasing in the direction of the locking movement thereof, said inner resilient member being annular and having an internal thread corresponding to the thread of the bolt.

In testimony whereof I affix my signature.

IGINO GUIDUCCI.